Feb. 12, 1963  C. D. HOBSON  3,077,003
PLUNGER MOLD
Filed April 14, 1960
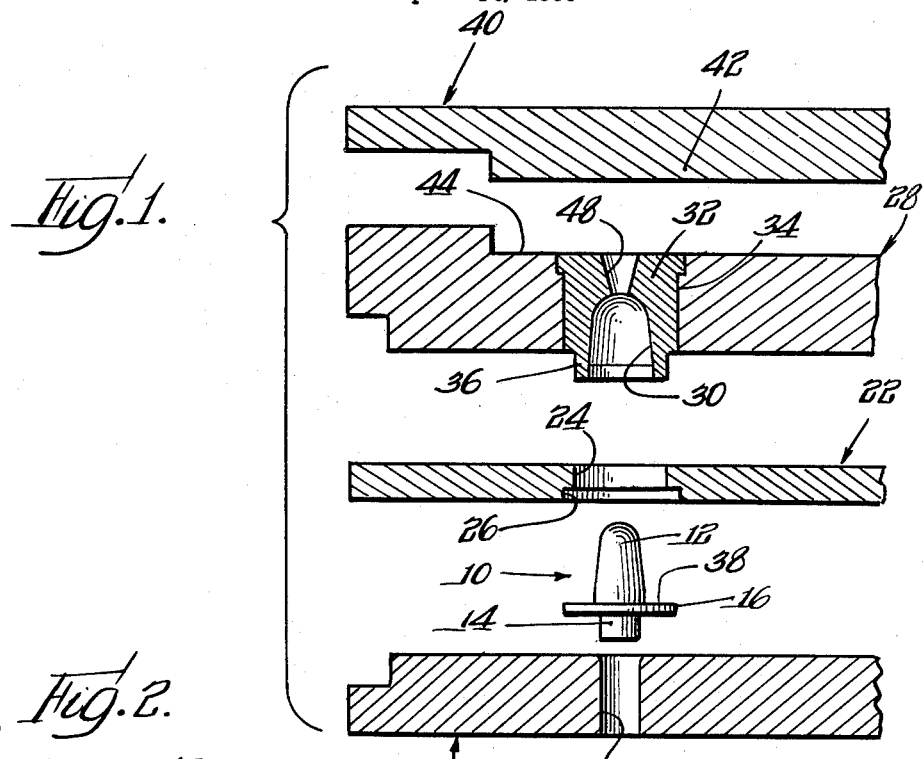
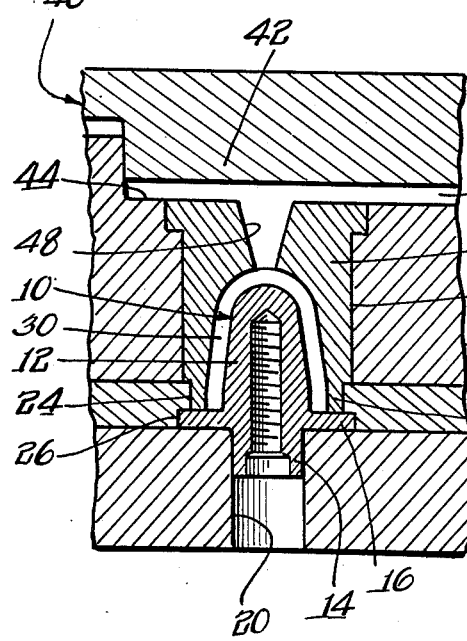
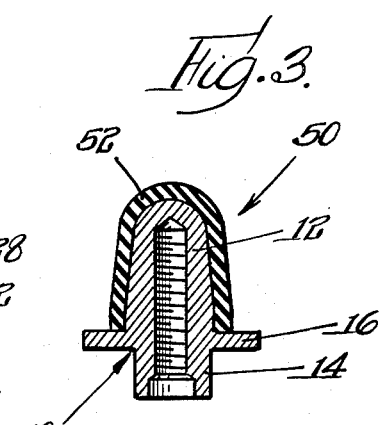
INVENTOR.
Carroll D. Hobson
BY Olson & Trexler
attys United States Patent Office 3,077,003
Patented Feb. 12, 1963

3,077,003
PLUNGER MOLD
Carroll D. Hobson, Goshen, Ind., assignor to Goshen Rubber Co., Inc., Goshen, Ind., a corporation of Indiana
Filed Apr. 14, 1960, Ser. No. 22,259
4 Claims. (Cl. 18—36)

This invention relates generally to rubber molding apparatus and especially to apparatus for molding rubber articles having rigid inserts.

Many rubber parts are desirably molded with a rigid insert of metal, hard rubber or resinous plastic material; and when such inserts are to be incorporated, provision must be made for positioning them properly in the mold. Most commonly, the inserts are positioned by contact with the molding dies. This arrangement avoids the necessity of removable support pins. Removable support pins are, however, required when the insert is to be completely imbedded in the rubber. In other circumstances, permanent magnets have been employed to hold steel inserts in place.

The general shape of a rubber part can also create a problem, particularly when the part has a tapered or parabolic shape. Removal of such a part from a conventional two-piece mold has proved to be exceedingly difficult because of the partial vacuum formed between the molded part and its surrounding mold cavity. Moreover, parts of this general nature are frequently intended for special purposes which, of their nature, preclude the existence of a flash line on the body of the part. The combined problems of positioning a rigid insert, avoiding a flash line and extracting a tapering, finished part from the mold have heretofore presented a substantial barrier to the commercial production of parts having such combined requirements.

Accordingly, an important object of the present invention is to provide rubber molding apparatus which overcomes the limitations of the prior art by producing rubber parts having a rigid insert and having a generally tapered body without the incurrence of flash on the working surface of the part.

A more general object of the invention is to provide a new and improved rubber molding apparatus.

Another object of the invention is to provide apparatus for molding a rubber part with a rigid insert, which apparatus facilitates stripping of the individual part from the mold.

Still another object of the invention is to provide apparatus for molding a rubber part with a metal insert, which apparatus effectively avoids galling with the insert.

Additional objects and features of the invention pertain to the particular structure and arrangements whereby the above objects are attained.

The invention, both in its structure and mode of operation, will be better understood by reference to the following disclosure and drawing forming a part thereof, wherein:

FIG. 1 is a disassembled view in cross-section showing rubber molding apparatus constructed in accordance with the invention;

FIG. 2 is an enlarged, sectional view showing the apparatus of FIG. 1 in its assembled condition; and FIG. 3 is a central, cross-sectional view of a rubber part with a rigid insert made using the apparatus of FIG. 1.

Referring now in detail to the drawing, specifically to FIG. 1, a rigid insert 10, preferably fashioned from a metal such as brass, will be seen to include a body portion 12, a tenon portion 14 and a shoulder-defining portion 16 disposed integrally between the portion 12 and 14. The body portion 12 ordinarily displays a generally tapered shape, such as the parabolic shape which is shown; and while the shoulder-defining portion 16 may take a number of advantageous shapes, it preferably takes the shape of a laterally extending disc.

In the embodiment of the mold apparatus which is shown, a four-piece die will be seen to include a base plate 18 which is provided with an aperture 20. In assembling the mold for use, insert 10 will be placed on the base plate 18, locating the tenon portion 14 in the aperture 20.

The molding die or appartaus also includes a stripper plate 22, and this stripper plate 22 is fashioned with a bore 24 which is adapted to pass the body portion 12 when the plate 22 is assembled over the base plate 18. Stripper plate 22 also defines a counterbore 26 which is adapted to receive the shoulder-defining portion 16 for purposes of holding the insert 10 in place vertically and retaining the insert when the molding operation is completed as will be described more fully hereinafter.

The molding apparatus also includes an intermediate plate 28 which is arranged to fit over the stripper plate 22 and to define a mold cavity 30 about the body portion 12 of insert 10. Advantageously, the cavity 30 is defined in an insertable member 32 which is carried in an appropriately shaped recess 34 formed in the intermediate plate 28.

In accordance with a feature of the invention, the member 32 includes a projection 36 which is adapted to enter the bore 24 in the annular space defined between the sidewalls of bore 24 and the sidewalls of body portion 12. This arrangement of member 32 has effectively eliminated the occurrence of galling in operation of the molding die by not passing the metal of the die over the metal of the insert in assembling or disassembling the mold. Moreover, this arrangement of member 32 has occasioned a shutting-off of the cavity 30 on the upper surface or cheek 38 of the shoulder-defining portion 16, thereby eliminating flash on the working surface of the finished part.

Fnally, the molding apparatus comprises a cover plate 40 including a plunger portion 42 which is adapted to enter a relieved portion 44 in intermediate plate 28 in order to define thereby a transfer well 46, best indicated in FIG. 2. This well 46 receives a quantity of rubber compound which is to be molded about the body portion 12 of insert 10; and advantageously, the member 32 includes a sprue 48 communicating the well 46 with the mold cavity 30.

Assembly of the molding apparatus proceeds as has been indicated hereinabove, i.e. the insert 10 being first positioned over the base plate 18 with the tenon portion 14 entering the aperture 20. Subsequently, the stripper plate 22 is positioned over the base plate 18 so that the shoulder-defining portion 16 enters the counterbore 26 and the body portion 12 passes through the bore 24. Thereafter, the intermediate plate 28 is assembled over the stripper plate 22, the projection 36 entering the annular recess between the sidewalls of bore 24 and the sidewalls of body portion 12.

A suitable quantity of a desired rubber compound is then placed in the relieved portion 44 and the cover plate 40 placed over the intermediate plate 28, plunger 42 entering the relieved portion 44. A compressive force tending to move the cover plate 40 in the general direction of the base plate 18 is applied to urge quantities of the rubber compound through the sprue 48 into the mold cavity 30; and while pressure is still being held on the mold, heat is additionally applied to vulcanize the rubber compound.

When vulcanization has been completed, cover plate 40 may be easily removed after the molding die has been withdrawn from the press. The flash pad which is cured in the well 46 can then be stripped to remove with it the rubber cured in the sprue 48. When the intermediate plate 28 is pried away from the stripper plate 22, the finished part 50 which is indicated in FIG. 3, will be retained by the stripper plate 22 because of the abutting relationship between the shoulder-defining portion 16 and the counterbore 26. Subsequently, the part 50 may be easily pounded from the stripper plate 22 after the base plate 18 has been removed, no partial vacuum being formed between the part and any of the mold units.

With reference to FIG. 3, the finished part 50 will be seen to include the rigid insert 10, its body portion 12 being enveloped in a general tapering mass 52 of cured rubber. As will be recognized, the mass 52 may be subsequently ground or otherwise finished in a desired manner. A part, such as the illustrated part 50, has been employed to advantage in, for example, gate valves. However, the invention is not intended to be limited to the production of parts for any specific use.

From the foregoing description, it will become apparent that the present invention provides molding apparatus which efficiently produces rubber parts having a rigid insert, this production being achieved without the incurrence of flash on the working surfaces of the part. Furthermore, galling of the insert is avoided and removal of the finished part from the mold is facilitated.

Accordingly, the specific example herein shown and described should be considered as illustrative only. Various changes in structure will, no doubt, occur to those skilled in the art; and these changes are to be understood as forming a part of this invention insofar as they fall within the spirit and scope of the appended claims.

The invention is claimed as follows:

1. Apparatus for molding a rubber part with a rigid insert, said apparatus comprising: a first plate; a second plate disposable over said first plate and having a hole therethrough for freely passing a first portion of said insert, said second plate further having a recess aligned with said hole and disposable adjacent said first plate for receiving a second portion of said insert to restrain said insert against movement relative to said first plate; and a third plate disposable over said second plate, said third plate including means defining a mold cavity and means for charging material into said cavity, said cavity being of generally conoidal shape and having a base, a vertex and sides tapering from said base to said vertex, the walls of said cavity surrounding the sides and one end of said first portion of said insert spaced outwardly therefrom, separation of said second plate and said third plate upon completion of a molding operation serving to extract the finished part from the mold cavity.

2. Apparatus for molding a rubber part with a rigid insert, which insert has a body portion, a tenon portion and a shoulder-defining portion therebetween, said apparatus comprising: a first plate having a recess adapted fittingly to receive said tenon portion whereby to locate said insert in position; a second plate disposable over said first plate and having a bore therethrough for freely passing said body portion, said second plate further having a counterbore disposable adjacent said first plate for receiving said shoulder-defining portion to restrain said insert against movement relative to said first plate; a third plate disposable over said second plate, said third plate including means defining a mold cavity and means for charging material into said cavity, said cavity having a base, a vertex and sides tapering from said base to said vertex, the walls of said cavity surrounding the sides and the exposed end of the body portion of said insert spaced apart therefrom, the walls of said cavity abutting a cheek of said shoulder-defining portion to establish a mold parting plane coincident with said cheek whereby to prevent the occurrence of flash on the tapering surface of the rubber part molded about said insert.

3. Apparatus for molding a rubber part with a rigid insert, which insert has a body portion, a tenon portion and a shoulder-defining portion therebetween, said apparatus comprising: a base plate having a recess adapted fittingly to receive said tenon portion whereby to locate said insert in position; a stripper plate disposable over said base plate and having a bore therethrough for freely passing said body portion, said bore being of greater diameter than said body portion to define an annular recess thereabout, said stripper plate further having a counterbore disposable adjacent said base plate for receiving said shoulder-defining portion to restrain said insert against movement relative to said base plate; an intermediate plate disposable over said stripper plate; a cavity-defining member in said intermediate plate adapted to enter the recess surrounding said body portion, said member including means defining a mold cavity having a base, a vertex and sides tapering from said base to said vertex, the walls of said cavity surrounding the sides and the exposed end of the body portion of said insert spaced apart therefrom; a cover plate disposable over said intermediate plate, said cover plate cooperating with said intermediate plate in defining a rubber compound-receiving transfer well therebetween; and means defining a sprue between said well and the vertex of said mold cavity.

4. Apparatus in accordance with claim 3 wherein said insert is fashioned from a different metal than said plates and said member and wherein the walls of said cavity are sufficiently spaced apart from the surfaces of said insert to avoid contact therewith in assembling and disassembling said apparatus.

References Cited in the file of this patent

UNITED STATES PATENTS

| | | |
|---|---|---|
| 1,621,000 | Crowley | Mar. 15, 1927 |
| 1,776,017 | Brownson | Sept. 16, 1930 |
| 2,279,208 | Shaw | Apr. 7, 1942 |
| 2,456,615 | Berglund | Dec. 21, 1948 |
| 2,465,276 | Ryder | Mar. 22, 1949 |
| 2,717,793 | Nenzell | Sept. 13, 1955 |
| 2,982,999 | Stewart | May 9, 1961 |